(12) United States Patent
Chindyasov

(10) Patent No.: US 8,921,250 B2
(45) Date of Patent: Dec. 30, 2014

(54) DISPOSABLE ADOBE TABLEWARE AND METHODS FOR MAKING SAME

(75) Inventor: Vadim Chindyasov, Novocheboksark (RU)

(73) Assignee: OAK Novations, Ltd., MiddleSex, NJ (US)

( * ) Notice: Subject to any disclaimer, the term of this patent is extended or adjusted under 35 U.S.C. 154(b) by 165 days.

(21) Appl. No.: 13/325,006

(22) Filed: Dec. 13, 2011

(65) Prior Publication Data

US 2013/0150228 A1   Jun. 13, 2013

(51) Int. Cl.
*C04B 35/00*  (2006.01)
*C04B 33/00*  (2006.01)

(52) U.S. Cl.
USPC .......................... 501/141; 501/129; 501/145

(58) Field of Classification Search
USPC ....................... 501/127, 129, 130, 141–150
See application file for complete search history.

(56) References Cited

U.S. PATENT DOCUMENTS

| | | | | |
|---|---|---|---|---|
| 2,420,863 | A | * | 5/1947 | Charles .......................... 501/82 |
| 4,259,282 | A | | 3/1981 | Goldsmith |
| D265,348 | S | | 7/1982 | Mondragon |
| 4,365,451 | A | * | 12/1982 | Nelson ......................... 52/169.9 |
| 4,604,255 | A | * | 8/1986 | Walt et al. ..................... 264/273 |
| 4,640,671 | A | | 2/1987 | Wright |
| 6,224,359 | B1 | | 5/2001 | Domazet |

* cited by examiner

*Primary Examiner* — Noah Wiese

(57) ABSTRACT

A method of making disposable adobe dinnerware articles includes providing extracted clay with inclusions removed, preparing the clay to a predetermined consistency, and combining the clay with a filler to create an adobe mixture. The method can also include adding an additive, testing the humidity level of the adobe mixture and adjusting the humidity of the adobe mixture when the humidity is not within a predetermined humidity range, and preheating a mold. The method can also include adding the adobe mixture to the mold, and pressing the adobe mixture in the mold and heating the mold in a series of production stages to form a molded adobe tableware product.

11 Claims, 5 Drawing Sheets

DISPOSABLE ADOBE TABLEWARE AND METHODS FOR MAKING SAME

Embodiments relate generally to disposable tableware, and, more particularly, to biodegradable adobe disposable tableware and methods of forming the same.

Standard disposable plastic tableware and utensils posses a number of drawbacks. These products may have negative environmental impact and provide diminished utility (e.g., lower heat thresholds, the spontaneous isolation of the specific chemical connections from the plastic in the course of time, and the inability to use the articles in microwave ovens). These drawbacks similarly affect plastics derived from bioplastics (e.g., made from corn and similar sources), since they possesses the same deficiencies. Disposable paper articles provide diminished ecological returns and also have diminished thresholds for utility.

Ecologically friendly dinnerware is produced by VerTerra, of Long Island City, N.Y. The VerTerra dinnerware, however, is made in a process that uses fallen leaves as a source material and which production utilizing vapor under the pressure with subsequent heating. The technological process of the manufacture of the articles from VerTerra differs significantly from the process described herein in both the sequence and series of the operations. For example, VerTerra's process uses leaves as the primary raw material.

The present invention was conceived in light of the above-mentioned drawbacks and limitations, among other things.

In general, one or more embodiments can include disposable tableware produced from a lightened adobe mixture, including clay and reinforcing plant-based fibrous material (e.g., straw, shaving, chaff, pine needles or the like).

The technology of building houses from adobe exists for the duration of several millennia. Adobe is a mixture of clay and other components such as earth, sand, and plant filler (e.g., straw), and is a sufficiently durable building material. The technology of the building of adobe houses does not provide for the kilning of adobe, only in-situ drying in the process of building.

The adobe tableware described herein can provide antiseptic properties of clay, a high saturation of useful minerals, which can make a microclimate in the accommodation healthy and to a certain degree possibly therapeutic. For example, clay is widely used in medicine, cosmetic and other health products.

At least one embodiment can include disposable tableware which is made by an industrial process similar to that used in adobe buildings where initial materials include clay and a plant-based reinforcing filler (e.g., straw). The process can include direct pressing with simultaneous drying. A finished article may not require firing as is common in standard manufacturing techniques for ceramic ware from clay. Only high-temperature drying of a product (to 270 degrees) may be performed.

DETAILED DESCRIPTION

In general, an embodiment of the adobe tableware described herein can create a new product and market niche for producers of potteries and clay ceramics. Also, health-related companies may be interested in nutritional and/or therapeutic properties provided by adobe tableware. Further, the adobe tableware can provide an alternative disposable tableware for environmental and health conscious restaurants, organizations and individuals.

At least one embodiment can provide safe serving of food for people. Where the safety features include ecological cleanliness of tableware, and its strength and its ability to maintain the high temperature of food and beverages. A second important feature of adobe tableware is that it may not damage the environment. In a moist environment, such as a landfill, the adobe tableware described herein may be softened and destroyed in the course of one month or earlier, and the plant-based filler will decompose naturally.

A basic difference between the adobe tableware and existing disposable tableware may be that the production of adobe tableware is possible utilizing a production line in any contemporary enterprise, which generates the ceramic burned tableware, articles made of the unburned clay, and also at a factory, which is occupied by the production of adobe building materials, with little or no modification.

Moreover, this provides a new product having smaller expenditures than, for example, a ceramic or pottery manufacturer attempting to build a production line for paper or plastic tableware.

Adobe tableware can provide a higher hardness than disposable tableware made of paper, plastic or unfired clay. Further, adobe tableware may prevent leaking or seep through for a longer period of time compared to paper or unfired clay. Adobe tableware may possess antiseptic properties. Also, adobe tableware can provide temperature properties similar to that of ceramic or china tableware, since clay possesses thermo-accumulation properties.

Adobe tableware may be cheaper to produce compared with other types of earthenware. Also, adobe tableware can provide a durable product, which does not break easily, and has a sufficiently original "natural" appearance.

Figure 1:
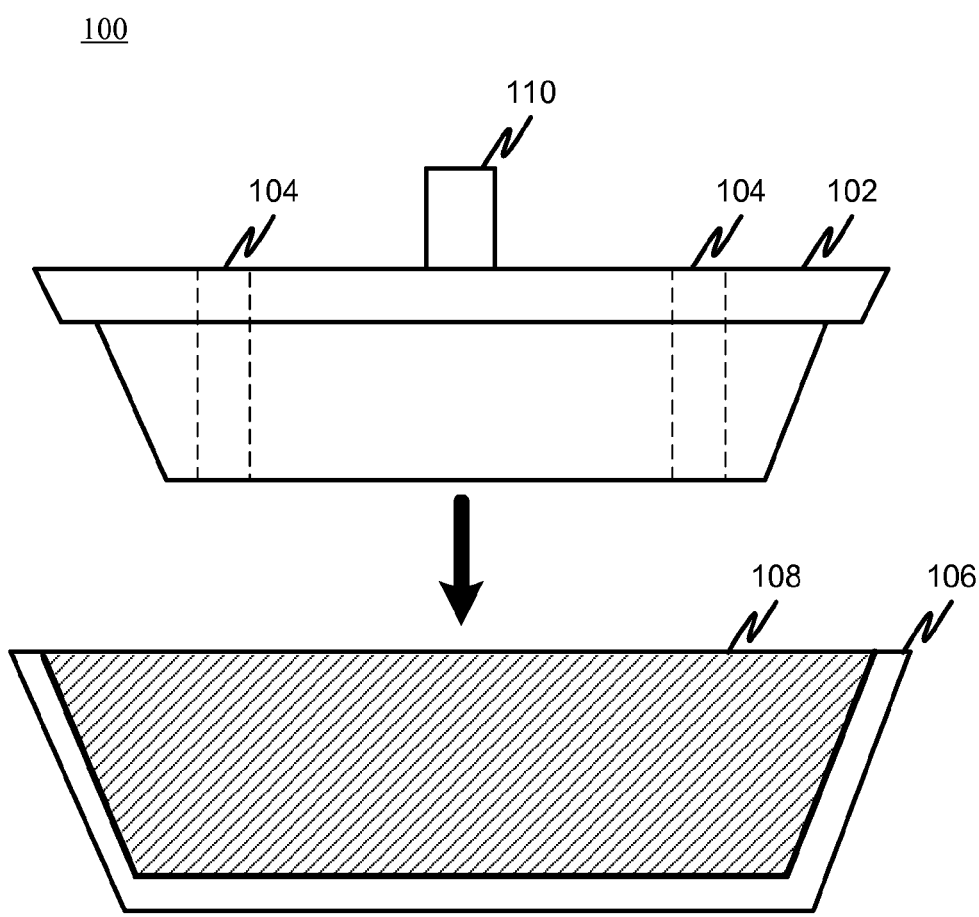
FIG. 1 is a diagram of an exemplary press mold for making biodegradable tableware in accordance with at least one embodiment.

FIG. 1 shows an exemplary press mold 100 for making biodegradable tableware in accordance with at least one embodiment. The mold 100 includes a first portion 102 having a plurality of apertures 104 for selectively releasing moisture. The first portion 102 also includes an attachment 110 for attaching the first portion to an automatic or manual press. The mold 100 also includes a second portion 106 into which an adobe mixture 108 can be placed.

In operation, the first portion 102 is pressed into the second portion 106 containing the adobe mixture 108. See, FIG. 2.

Figure 2:
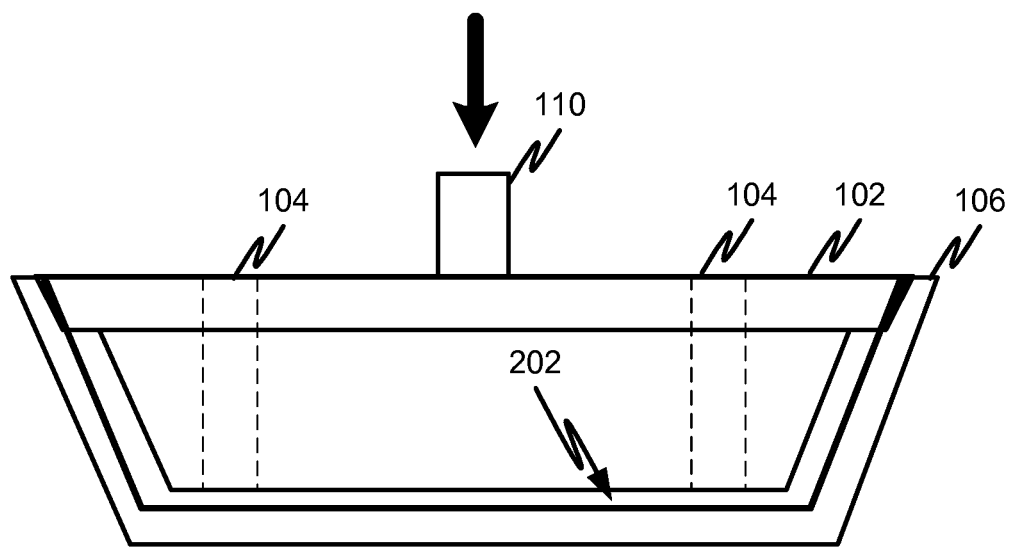
FIG. 2 is a diagram of an exemplary press mold for making biodegradable tableware in accordance with at least one embodiment.

As shown in FIG. 2, the adobe mixture, when pressed, assumes the shape of an object 202, in this case a tableware item such as a bowl or plate. (See, e.g., FIG. 4).

Figure 3:
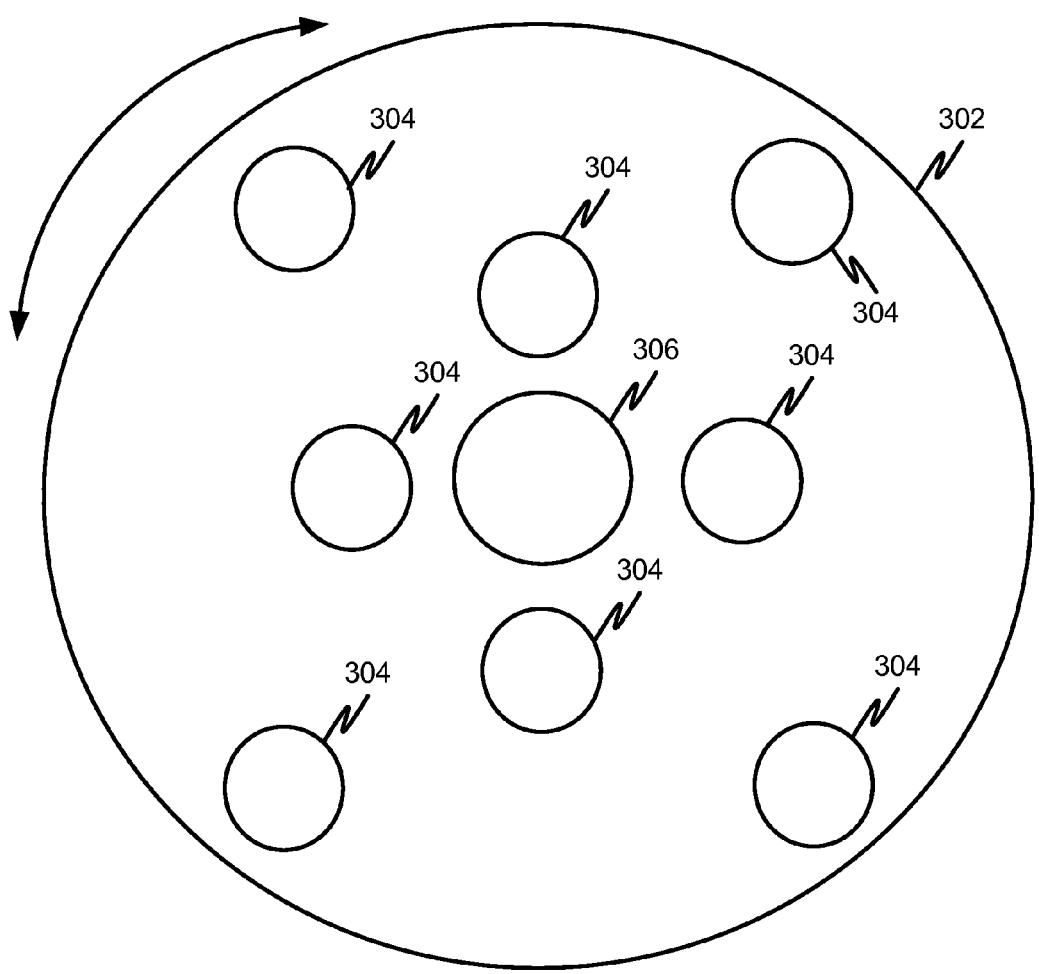
FIG. 3 is a diagram of an exemplary mold vapor release plate in accordance with at least one embodiment.

FIG. 3 shows a top view of an exemplary mold vapor release plate 300. The plate 300 includes a round body portion 302, a plurality of apertures 304 and a central aperture 306.

In operation, the plate can be rotated to allow moisture to escape from the adobe mixture in a mold. The first portion 102 of the mold 100 can include complimentary apertures 104 that can be aligned with the apertures 304 on the plate 300. By rotating the plate 300 such that the apertures 304 of one plate are not in alignment with the apertures 104 on the first mold portion 102, moisture is not permitted to be released from the adobe mixture. When the apertures 304 on the plate 300 are aligned with the apertures 104 on the first mold portion 102, moisture is permitted to be released from the abode mixture. It will be appreciated that other suitable moisture release mechanisms can be used.

Figure 4:
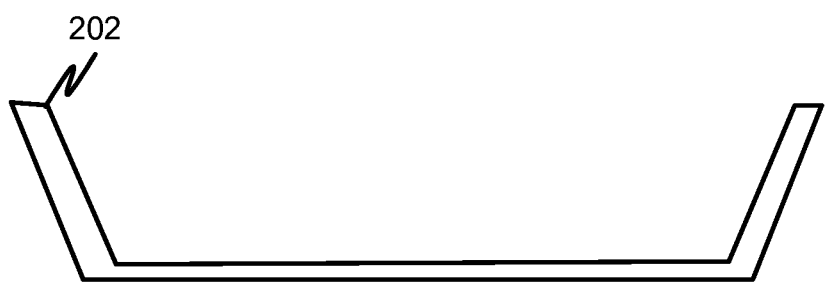
FIG. 4 is a cross-sectional diagram of an exemplary tableware article in accordance with at least one embodiment.

FIG. 4 is a cross-sectional diagram of an exemplary tableware article 202 in accordance with at least one embodiment.

Figure 5:
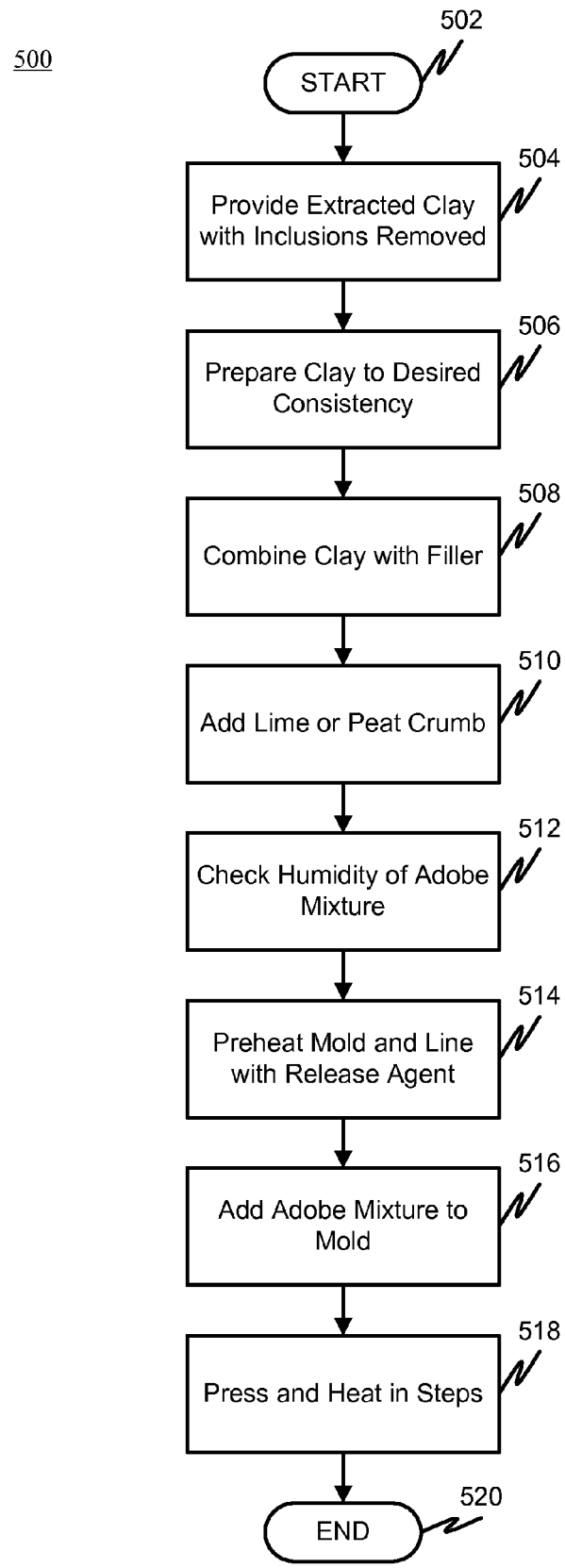
FIG. 5 is a chart of an exemplary process for making adobe tableware in accordance with at least one embodiment.

FIG. 5 is a chart of an exemplary process for making adobe tableware in accordance with at least one embodiment. The process begins at 502 and continues to 504.

At 504, extracted clay is provided, which is free from inclusions such as stones, garbage, or the like. The process continues to 506.

At 506, the clay is prepared to a desired, predetermined consistency. For example, if clay is too "fat", sand can be added. If the clay is too "lean", water can be added. The process continues to 508.

At 508, the clay is combined with a filler material. The filler can be a plant-based material, such as cut straw in length of about 7-10 cm, for example. Other filler can be used such as wood shavings, pine needles, or other fibrous fillers. The filler material can be added to an amount of about 30% to 50% by weight. The process continues to 510.

At 510, an anti-caking or alkaline agent approved for use in food can be added such as lime (e.g., Calcium hydroxide E526) or peat crumb. The lime can be added to an amount of about 5%-20% by weight. The peat crumb can be added to an amount of about 20% to 30% by weight. These additives can permit the adobe mixture to harden quickly and be resistant to liquids. The process continues to 512.

At 512, the moisture content of the adobe (or clay) mixture is checked and corrected if necessary. Preferably, moisture content should be within about 6% to 10% by weight, can be corrected by a preliminary pre-drying step or moisture addition step. The process continues to 514.

At 514, the mold is optionally preheated, for example to about 50 degrees centigrade. Also, optionally, a mold release agent can be applied, for example, the mold can be showered with small vegetative particles (chaff, grain husks or the like) to prevent the adobe tableware item from sticking to the mold. The process continues to 516.

At 516, a predetermined amount of the adobe mixture is added to the mold (e.g., the second mold portion). The process continues to 518.

At 518, one or more production stages including applying heat and/or pressure is performed. For example, the first portion of the mold can be pressed into the second portion of the mold. The pressing can be performed automatically or manually. While the mold is being pressed, the mold can be subjected to a series of temperature levels. The temperature levels can vary depending on the type of product being manufactured and can include up to three different sub-steps.

In a first stage, which can be used for tableware intended for holding dry or wet substances, the raw adobe mixture is placed in a mold that has been preliminary heated to 50 degrees centigrade (as described above), and then the mold is closed and heated up to about 100 degrees centigrade. The mold apertures for moisture and air release are opened for about 10 minutes. Next, the apertures are closed and a pressure of about 5-15 MPa is applied. Pressure can be gradually applied over a period of about 10-60 seconds, for example, depending on rate of change of press. Uniform pressing is preferable, over shock-pressing.

Next, the pressing force is discontinued and there is a further heating stage up to about 150 degrees centigrade. The moisture release apertures are opened for about 10 minutes. The apertures are then closed and pressure is applied to about 10-20 MPa.

If there is to be only one production stage carried out, then the compression mold is opened and allowed to cool down without extraneous intervention to about 50 degrees centigrade. Once this first sub-step is complete, a product for use with dry substances is ready and the first production stage is finished. However, if there is to be a second production stage carried out, then the following operations can be performed.

In a second, optional, production stage, which can be used for adobe tableware products intended to hold liquid substances, the series of temperature levels is continued. For example, the pressure applied to the mold can be discontinued and may not be applied any more. The apertures for moisture and air release can be opened, and the mold can be heated to a series of temperatures, for example to about 200, 250 and then 270 degrees centigrade. In order to avoid cracks in the product, the rate of temperature change should not be more that about 10 degrees centigrade/minute.

In a third production stage, the tableware product can be removed from the mold at the end of the second production stage (e.g., at 270 degrees centigrade) and plunged into a paste prepared from a gluten material (e.g., starch, flour or the like). When the product at temperature of about 270 degrees centigrade plunges into a warm (30-50 degrees centigrade) paste, the paste material tends to fill any crevices or voids in the surface of the tableware product and the paste adheres strongly to the surface of the product and forms an organic waterproof (or water resistant) film. Then the product can be removed from the paste dip, the excess paste can be rinsed off and the product can be dried.

In another example the series of temperature stages includes a first stage of about 100 degrees centigrade, a second stage of about 150 degrees centigrade, a third stage of about 200 degrees centigrade, a fourth stage of about 250 degrees centigrade and a fifth stage of about 270 degrees centigrade. Alternatively, in yet another example, the series of temperature stages includes a first stage of about 100 degrees centigrade and a second stage of about 120 degrees centigrade. In still another alternative, the temperature stages can include a single stage of about 170 to 180 degrees centigrade. Before, during or after each temperature step, moisture can be released from the adobe mixture according to the method described above in connection with FIG. 4. The process continues to 520, where the process ends.

The mixture can be pressed to a pressure of about 10-25 MPa, for example. The pressure used may depend on the humidity of the adobe mixture. At a higher humidity it may be necessary to use a higher pressure to overcome the internal pressure of the moisture.

While described in terms of tableware, it will be appreciated that the process described herein can be used to manufacture other goods. For example, any fabricated shapes (toys, statuettes, decorative items, certain furniture elements, light-duty components, packing materials or the like). In general, any article for that does not require unusually high strength or resistance to abrasion, may be made using the process described herein. For example, many articles made of the plastic, which are not subject to prolonged contact with moisture (e.g., dry goods containers, supports, cases or the lie) can be made using an embodiment of the process described herein.

It is, therefore, apparent that there is provided, in accordance with the various embodiments disclosed herein, adobe tableware and a system and method for making the same.

While the invention has been described in conjunction with a number of embodiments, it is evident that many alternatives, modifications and variations would be or are apparent to those of ordinary skill in the applicable arts. Accordingly, Applicant intends to embrace all such alternatives, modifications, equivalents and variations that are within the spirit and scope of the invention.

What is claimed is:

1. A method of making disposable adobe dinnerware articles, the method comprising:
   providing extracted clay with inclusions removed;
   preparing the clay to a predetermined consistency;
   combining the clay with a filler to create an adobe mixture by mechanically including an organic filler making up to about 30% to 50 % of the adobe mixture by weight;
   adding an additive;
   measuring moisture content of the adobe mixture and adjusting the moisture content of the adobe mixture when the moisture content is not within a predetermined moisture content range;
   preheating a mold;
   adding the adobe mixture to the mold; and
   pressing the adobe mixture in the mold and heating the mold in a series of production stages to form a molded adobe tableware product.

2. The method of claim 1, further including adding sand to the clay if the consistency is too fat and adding water if the consistency is too thin.

3. The method of claim 1, wherein the additive includes lime making up about 5% to 25% of the adobe mixture by weight.

4. The method of claim 1, wherein the additive includes peat crumb making up about 20% to 30% of the adobe mixture by weight.

5. The method of claim 1, wherein the predetermined moisture content range is about 6% to 10% by weight.

6. The method of claim 1, wherein the mold preheating includes heating the mold to about 50 degrees centigrade.

7. The method of claim 1, further comprising treating the mold with a release agent prior to addition of the adobe mixture.

8. The method of claim 1, wherein the pressing and heating includes a first production stage in which the mold is heated under pressure to about 100 degrees centigrade and then to about 120 degrees centigrade.

9. The method of claim 8, wherein the pressing and heating includes a second production stage in which the mold is heated, not under pressure, to a temperature of about 200 degrees centigrade, then to about 250 degrees centigrade and then to about 270 degrees centigrade.

10. The method of claim 9, wherein the pressing and heating includes a third production stage in which the molded abode tableware product is removed from the mold and plunged into a warm paste bath, removed from the warm paste bath and any excess paste is rinsed off the molded adobe tableware product.

11. The method of claim 1, further comprising opening a plurality of apertures in the mold at the end of at least one of the series of temperature stages to release moisture from the adobe mixture.

\* \* \* \* \*